United States Patent
Furumi

(10) Patent No.: US 7,374,292 B2
(45) Date of Patent: May 20, 2008

(54) IMAGE PROJECTION TABLE

(75) Inventor: Yoshiyuki Furumi, Shiojiri (JP)

(73) Assignee: Seiko Epson Corporation (JP)

(*) Notice: Subject to any disclaimer, the term of this patent is extended or adjusted under 35 U.S.C. 154(b) by 276 days.

(21) Appl. No.: 11/244,339

(22) Filed: Oct. 5, 2005

(65) Prior Publication Data

US 2006/0087627 A1 Apr. 27, 2006

(30) Foreign Application Priority Data

Oct. 22, 2004 (JP) ............................. 2004-307759

(51) Int. Cl.
*G03B 21/14* (2006.01)
*G03B 21/22* (2006.01)
*G03B 21/26* (2006.01)
*G09F 13/04* (2006.01)

(52) U.S. Cl. .................. 353/119; 353/122; 353/47; 353/30; 353/22; 362/97

(58) Field of Classification Search ................ 353/119, 353/122, 63, 46, 47, 30, 22; 362/97
See application file for complete search history.

(56) References Cited

U.S. PATENT DOCUMENTS

| 3,024,696 | A | * | 3/1962 | Bomzer ...................... 33/1 M |
| 5,005,043 | A | * | 4/1991 | Kobayashi et al. ......... 355/404 |
| 2005/0110964 | A1 | * | 5/2005 | Bell et al. .................... 353/122 |
| 2006/0203208 | A1 | * | 9/2006 | Thielman et al. ............ 353/74 |

FOREIGN PATENT DOCUMENTS

| JP | 05-181437 | | 7/1993 |
| JP | 2000221895 A | * | 8/2000 |
| JP | 2000-284851 | | 10/2000 |
| JP | 2000284851 A | * | 10/2000 |
| JP | 2004-109402 | | 4/2004 |

* cited by examiner

*Primary Examiner*—Diane I. Lee
*Assistant Examiner*—Magda Cruz
(74) *Attorney, Agent, or Firm*—Harness, Dickey & Pierce

(57) ABSTRACT

An image projection table including: a projector which projects an image; a housing in which the projector is housed; and a top plate on which the image projected from the projector is projected, wherein the top plate includes an operational part for operating the projector, and a top plate driving part which moves the top plate so that the operational part is located on the operator side.

5 Claims, 10 Drawing Sheets

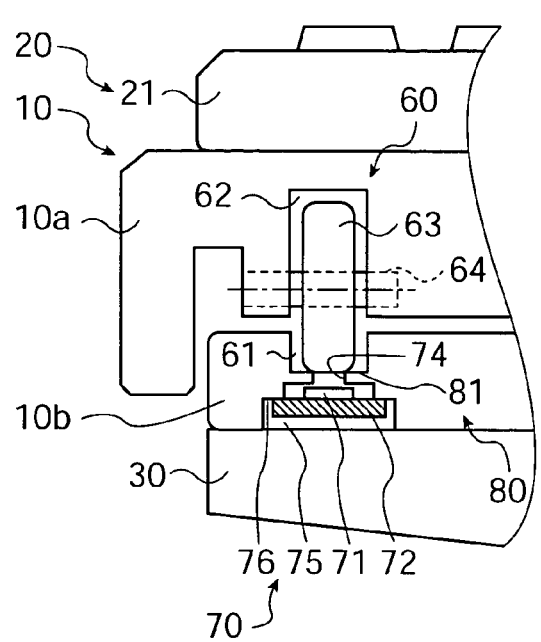 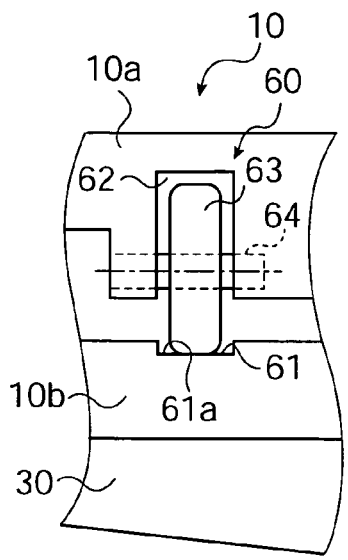 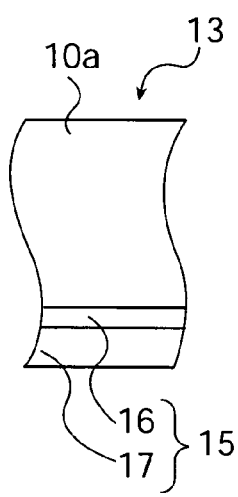
FIG. 4A  FIG. 4B  FIG. 4C
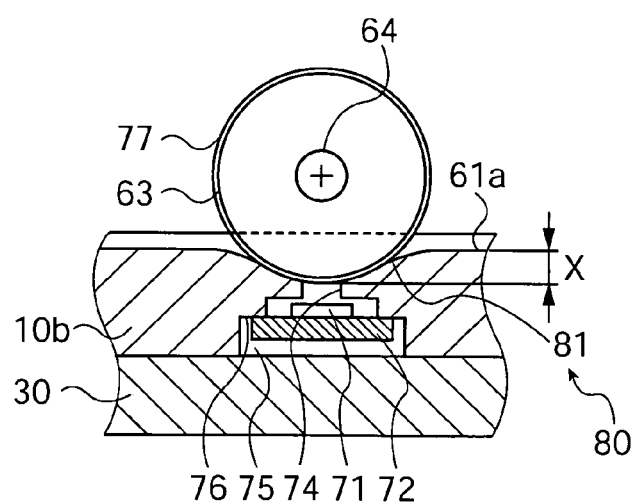
FIG. 5

IMAGE PROJECTION TABLE

RELATED APPLICATIONS

This application claims priority to Japanese Patent Application No. 2004-307759 filed Oct. 22, 2004 which is hereby expressly incorporated by reference herein in its entirety.

BACKGROUND OF THE INVENTION

1. Technical Field

The present invention relates to an image projection table which projects an image on a table.

2. Related Art

As the image projection table, as disclosed in JP-A-2000-284851, a table type information terminal device has been known. The table type information terminal device comprises a projection type display unit housed in a housing, a transparent glass plate which constitutes a table arranged at the upper portion of the housing, and a coordinate position input unit which inputs a coordinate position of an image by the projection type display unit. Herein, a projection screen surface is formed on the transparent glass plate surface corresponding to the coordinate position input unit thereby to make possible the input of high accuracy without receiving an influence of visual difference. A coordinate position detecting device, which detects the input in the case that the coordinate position is input in the coordinate position input unit, is composed of an electrostatic capacity type or an electromagnetic induction type unit. The coordinate position input work is performed by touching an image surface displayed by the projection type display unit on a screen surface formed on the transparent glass plate surface with a user's finger or an electromagnetic pen having a lead wire.

The input method by touching the displayed image surface with the finger or the electromagnetic pen having the lead wire is suited to interactive input. However, in the case that the input operation is performed by projecting a display screen of a personal computer, there is a problem that this input method is unsuited on operativeness such as speed of an input operation and a recognition rate. Further, there is a problem that contents which a user that is an operator desires cannot be freely input.

SUMMARY

An advantage of the invention is to provide, in the case of an input operation using an operational part such as a keyboard, an image projection table in which convenience of the input operation is improved.

According to an aspect of the invention, an image projection table comprises a projector which projects an image, a housing in which the projector is housed, and a top plate on which the image projected from the projector is projected. Herein, the top plate includes an operational part for operating the projector, and a top plate driving part which moves the top plate so that the operational part is located on the operator side.

According to such an image projection table, the user, in the case that he operates the projector, can move the operational part provided for the top plate by the top plate driving part so that the operational part is located on the side of the user that is the operator. Therefore, it is not necessary for the user himself to move to the position of the operational part, so that the convenience of the input operation can be improved.

According to another aspect of the invention, an image projection table comprises a projector which projects an image, a housing in which the projector is housed, and a top plate on which the image projected from the projector is projected. Herein, the top plate includes a first top plate on which the image projected from the projector is projected, and a second top plate having an operational part for operating the projector; and the second top plate includes a top plate driving part which moves the second top plate so that the operational part is located on the operator side.

According to such an image projection table, the user, in the case that he operates the projector, can move the operational part provided for the second top plate by the top plate driving part so that the operational part is located on the side of the user that is the operator. Therefore, it is not necessary for the user himself to move to the position of the operational part, so that the convenience of the input operation can be improved. Further, since it is not necessary to move the first top plate on which the image is projected, in the case that food and drink are placed on the first top plate, it is not necessary to move the food and the drink, so that the convenience is improved. Since it is not necessary to move or turn the first top plate, deterioration of visual recognition, which is caused by the fact in which stains on the first top plate surface are located by the movement of the first top plate on the upper surface on which the image is projected, can be prevented.

It is preferable that: the image projection table according to the aspect of the invention includes a detection part which detects the movement of the top plate or the second top plate, and an image switching part which switches an image projecting direction; and in the case that the detection part has detected the movement, the image switching part switches the direction of the image to be projected from the projector on the basis of a detection signal of the detection part correspondingly to the moving amount, thereby to switch the direction of the image to be projected on the top plate or the first top plate.

According to such an image projection table, by the detection part and the image switching part, the direction of the image to be projected from the projector is switched correspondingly to the moving amount of the top plate or the second top plate. Therefore, the user, in the case that he operates the projector at the operational part, when the top plate or the second top plate is moved to the position of the user, switches the direction of an image to be projected so that its direction is matched with the visual recognition direction of the user. Therefore, the visual recognition of the image improves and input operativeness further improves.

Further, it is preferable that: the image projection table includes a detection part which detects the movement of the top plate or the second top plate, and a projector moving part which moves the projector body; and in the case that the detection part has detected the movement, the projector moving part, on the basis of detection signals of the detection part, correspondingly to the moving amount, moves the projector body, thereby to switch the direction of the image to be projected on the top plate or the first top plate.

According to such an image projection table, by the detection part and the projector moving part, correspondingly to the moving amount of the top plate or the second top plate, the projector body is moved, whereby the direction of the image to be projected is switched. Therefore, the user, in the case that he operates the projector at the operational part, when the top plate or the second top plate is moved to the position of the user, switches the direction of an image to be projected so that its direction is matched with the visual recognition direction of the user. Therefore, the visual recognition of the image improves and the input operativeness further improves.

Further, it is preferable that the image projection table includes a fixing part which fixes the top plate or the second top plate which moves.

According to such an image projection table, in the case that the top plate or the second top plate is moved, it can be prevented that the moving amount is too small or too large for the desired moving amount, the top plate or the second top plate can be fixed surely in the appropriate position, and operativeness can be improved.

BRIEF DESCRIPTION OF THE DRAWINGS

The Invention will be described with reference to the accompanying drawings, wherein like numbers reference like elements, and wherein:

FIG. 4 is a schematically sectional view of a top plate, in which FIG. 4A is a sectional view taken along a line A-A of FIG. 3, FIG. 4B is a schematically sectional view of a top plate driving part during turning, and FIG. 4C is a schematically sectional view of a screen region;

FIG. 5 is a sectional view taken along a line B-B of FIG. 3;

FIG. 6 is a circuit block diagram of a detection part and an image switching part, in which

FIG. 9 is a schematically sectional view of a top plate of an image projection table according to a third embodiment, in which

DETAILED DESCRIPTION

Embodiments of the invention will be described below with reference to drawings. In the embodiments of the invention, "movement" includes "movement with an angle (turn)" and "linear movement (movement in the right and left directions or in the up and down directions)". In the following description of the embodiments, these movements are used properly.

First Embodiment

Figure 1:
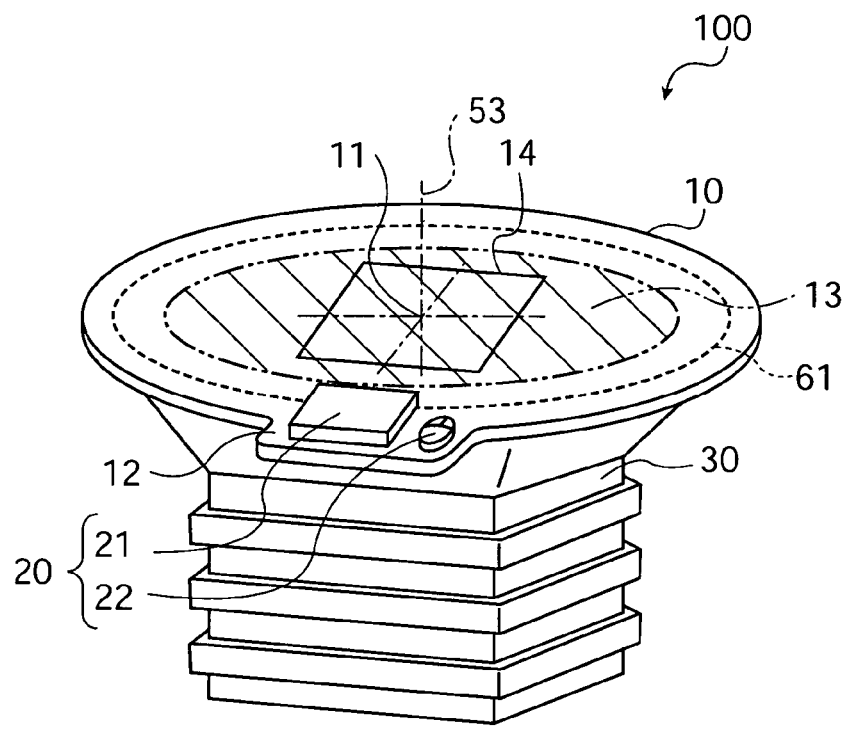
FIG. 1 is a schematically perspective view of an image projection table according to a first embodiment of the invention.
Figure 2:
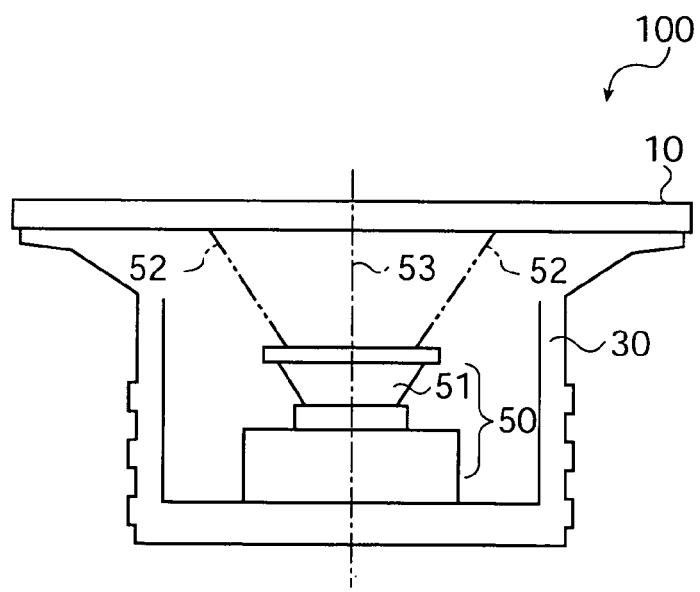
FIG. 2 is a schematically sectional view of the image projection table.
Figure 3:
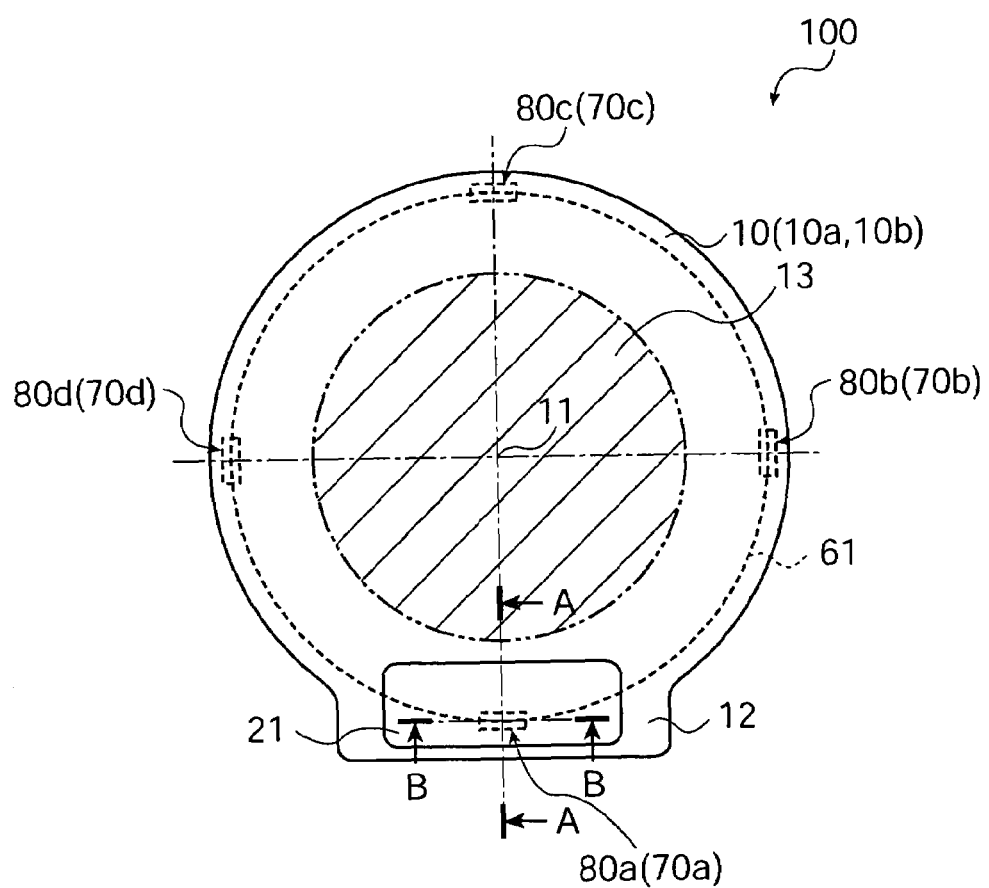
FIG. 3 is a plan view of the image projection table.

FIG. 1 is a schematically perspective view of an image projection table according to a first embodiment of the invention. FIG. 2 is a schematically sectional view of the image projection table. FIG. 3 is a plan view of the image projection table, viewed from the top plate side. Referring to FIGS. 1 to 3, the constitution and the operation of an image projection table 100 will be described.

As shown in FIGS. 1 and 2, the image projection table 100 of the embodiment comprises a top plate 10, a housing 30, and a projector 50.

The housing 30 is formed nearly in the shape of a cylinder, and houses in its center portion the projector 50 for projecting an image. The projector 50 has also a function of a personal computer, and can operate various application software. Simultaneously, the projector 50 can project the image, by a projection lens 51 provided for the projector 50, on the top plate located above the projector 50. Reference numeral 52 shown by a chain double-dashed line in FIG. 2 shows imagerially a spread of luminous flux of an image to be projected. Further, the projector 50 is housed in the housing 30 so that a center position 11 of the top plate 10 coincides with an optical axis 53 of a projection lens 51 of the projector 50 in their positional relation. Further, the housing 30 has also a function of supporting the top plate 10 horizontally. In the embodiment, though the projector 50 has the function of the personal computer, the projector 50 may be constituted separately from the personal computer and housed in the housing.

As shown in FIGS. 1 and 3, the top plate 10 has a nearly circular table surface. On the peripheral side of the top plate 10, a protruding part 12 that protrudes in the peripheral direction is provided. Onto the upper surface of this protruding part 12, a keyboard 21 as an operational part 20 for operating the projector 50 and the personal computer is fixed. Further, on the upper surface of the protruding part 12, space for operating a mouse 22 as the operational part 20 are also secured on both sides of the keyboard 21.

Connection between the projector 50, and the keyboard 21 and the mouse 22 is performed using wireless communication. In the embodiment, Bluetooth that is a short-distance wireless communication standard is adopted. On the other hand, the projector 50 is provided with a reception unit for receiving radio wave from the keyboard 21 and the mouse 22. The reception unit performs communication with an operation signal thereby to operate the application software of the projector 50 and the personal computer. As the communication method, other various short-distance wireless communication standards, including infrared remote control, than the Bluetooth can be adopted.

In the circular region of the top plate 10, a screen region 13 (shown by slant lines in the drawing) on which an image is projected from the projector 50 is formed. Further, as shown in FIG. 1, an image of aspect ratio 4:3 projected from the projector 50 is enlarged and projected onto a projection region 14 in the screen region 13 of the top plate 10 with the aspect ratio 4:3.

FIG. 4 is a schematically sectional view of the top plate in the embodiment. FIG. 4A is a sectional view taken along a line A-A of FIG. 3. FIG. 4B is a schematically sectional view of a top plate driving part during turning. FIG. 4C is a schematically sectional view of a screen region. FIG. 5 is a sectional view taken along a line B-B of FIG. 3. With reference to FIGS. 3, 4 and 5, the constitution and the operation of the top plate 10 will be described.

As shown in FIG. 4A, the top plate 10 comprises a top plate upside 10a and a top plate downside 10b. The top plate downside 10b is fixed to the housing 30. To the upper surface of the top plate upside 10a, the keyboard 21 is secured.

As shown in FIG. 4C, the screen region 13 is constituted by forming a transmission type screen 15 on the lower surface of the top plate upside 10a that uses a transparent tempered glass. The transmission type screen 15 is constituted by laminating a diffusion plate 16 as a transmission type optical sheet on the lower surface of the top plate upside 10a, and laminating Fresnel lens 17 on the lower surface of the diffusion plate 16. The Fresnel lens 17 uniformly makes the luminous flux that has been projected from the projector 50 and diffused the nearly parallel light. The diffusion plate 16 images the uniformized luminous flux thereby to project the projected image. Further, onto the upper surface of the top plate upside 10a, antireflection coating for preventing reflection of external light or peripheral light is applied, whereby visual recognition of the projected image is improved. The user can recognize visually the projection image imaged on the screen region 13 from the direction opposite to the incident direction of the projection light. Further, the top plate upside 10a has also rigidity which protects the transmission type screen 15 from distortion due to press by the user.

Regarding a top plate driving part 60 which turns the top plate 10, its constitution and operation will be described.

As described above, the top plate 10 comprises the top plate upside 10a and the top plate downside 10b, and the top plate downside 10b is fixed to the housing 30. As shown in FIGS. 4A and 4B, on the opposite surface of the top plate upside 10a to the top plate downside 10b, a wheel groove 62 is formed, which is a recess part having a U-shaped longitudinal section and a circular side section. Into the wheel groove 62, a wheel 63 is turnably supported by a support axis pin 64. Such wheel grooves 62 are provided in four positions on the top plate upside 10a which are equally distant from a center position 11 at intervals of an angle of 90°, and similarly, wheels 63 are turnably supported by support axis pins 64 into the wheel grooves 62. By the thus constructed wheels 63, the top plate upside 10a is kept horizontal to the housing 30 and the top plate downside 10b.

In the top plate downside 10b, a rail groove 61 that becomes a track of the wheel 63 is formed in a position opposite to the wheel 63 of the top plate downside 10b. The rail groove 61 that becomes the track is formed circularly with the center position 11 of the top plate 10 as a center (refer to the rail groove 61 shown by broken lines in FIG. 1 or 3). When the user applies power in the direction where he desires to turn the top plate upside 10a, the top plate upside 10a is turned, around the center position 11 of the top plate upside 10a, along the rail groove 61 by the top plate driving part 60.

Next, regarding a fixing part 80 which fixes the turn of the top plate 10, its constitution and operation will be described. The fixing part 80 fixes the turnable top plate upside 10a in the predetermined turn position. As shown in FIG. 3, in the embodiment, the fixing parts 80 are formed, on the track of the rail groove 61 formed in the top plate downside 10b, in four positions (80a, 80b, 80c, and 80d) as the predetermined turn positions which are spaced at an angle of 90°.

As shown in FIG. 5, the fixing part 80 is constituted by forming a fixing groove 81 having a recess part having a circular side section on a rail groove bottom surface 61a on the track of the rail groove 61 formed on the top plate downside 10b. The fixing grooves 81, correspondingly to the fixing parts 80, are formed on the track of the rail groove 61 in four positions which are spaced at an angle of 90°.

When the wheel 63 falls into the fixing groove 81 according to the turn of the top plate upside 10a, the top plate upside 10a is fixed. In order to turn the top plate upside 10a after the wheel 63 has fallen into the fixing groove 81, it is necessary to apply power by which the wheel 63 gets over the depth $\chi$ of this fixing groove 81 to the top plate upside 10a. Using this fact, the top plate upside 10a is fixed. The user, in the case that the fixed position is not the desired position, applies the power by which the wheel 63 gets over the depth $\chi$ of this fixing groove 81 to the top plate upside 10a. Hereby, the top plate upside 10a can be turned and is turned to the desired position, and the top plate upside 10a is fixed near the desired position and positioned.

Next, regarding a detection part 70 which detects a turn position (angle) of the top plate 10, its constitution and operation will be described.

As shown in FIG. 4, the detection part 70 comprises a magnetic sensor switch 71 and a circuit board 72 on which the magnetic sensor switch 71 and a cable which transmits the signal detected by the magnetic sensor switch 71 to the projector 50 are mounted. Further, the detection part 70 is formed together with the fixing groove 81 which constitutes the fixing part 80 and is formed in the top plate downside 10b. Therefore, as shown in FIG. 3, the detection parts 70 are formed in four positions (70a, 70b, 70c, and 70d) at intervals of an angle of 90°.

In order to fix the circuit board 72 and the magnetic sensor switch 71 mounted on the circuit board 72, a circuit fixing groove 75 is formed on the lower surface of the top plate downside 10b. Further, at the lowest portion of the recess part having the circular side section of the fixing groove 81, a plane-square hole 74 is formed. Further, the circuit fixing groove 75 is formed so that the hole 74 is located at the upper portion of the magnetic sensor switch 71. Here, the shoulder of the circuit board 72 is brought into contact with a step part 76 formed in the circuit fixing groove 75, whereby the detection part 70 is fixed.

Further, to the periphery of one wheel 63, a thin metal piece 77 is attached. The wheel 63 to which this metal piece 77 has been attached is located in the position of the fixing groove 81 (detection part 70), the magnetic sensor switch 71 of the detection part 70 changes from "OFF" to "ON". By this structure, the top plate upside 10a, every time it turns at an angle of 90°, is fixed by the fixing part 80, and simultaneously the turn position is detected by the detection part 70. This detection signal is transmitted to the projector 50, and an image switching part 59 (refer to FIG. 6) provided in the projector 50 judges which magnetic sensor switch 71 of the magnetic sensor switches of the detection parts 70 formed at the four positions is "ON", thereby to switch the direction of an image to be projected. The image switching part will be described later in detail.

Figure 6A:
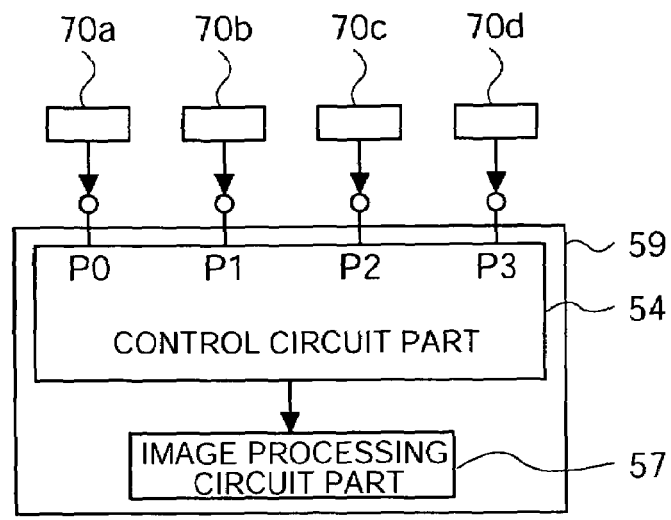
FIG. 6A is a circuit block diagram in the case that a signal of the detection part is directly interrupt-detected.
Figure 6B:
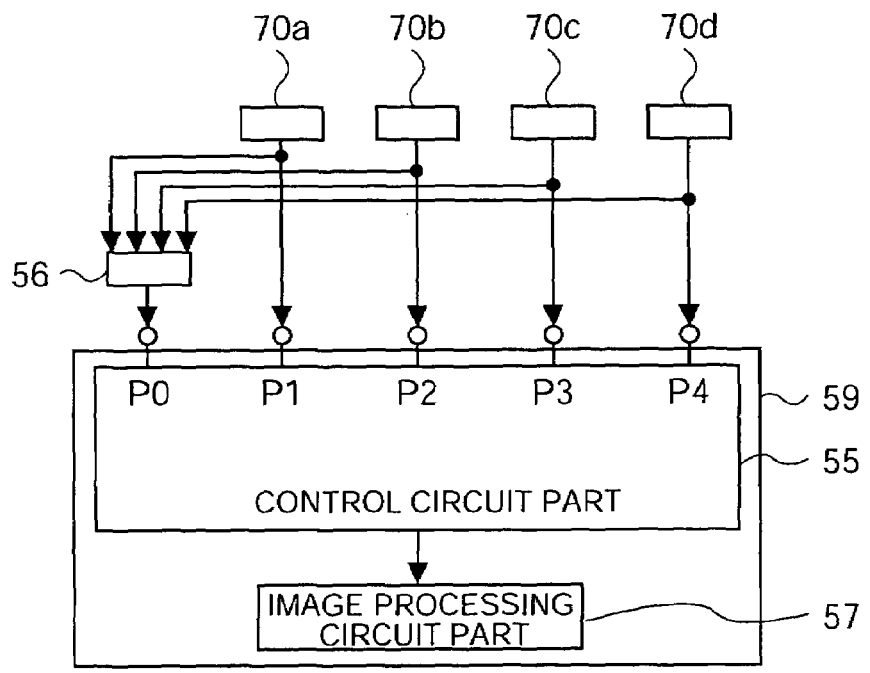
FIG. 6B is a circuit block diagram in the case that a signal of the detection part is indirectly interrupt-detected.

FIG. 6 is a circuit block diagram of the detection part and the image switching part. FIG. 6A is a circuit block diagram in the case that a signal of the detection part is directly interrupt-detected. FIG. 6B is a circuit block diagram in the case that a signal of the detection part is indirectly interrupt-detected. With reference to FIG. 6, the circuit constitution for detecting the signal of the detection part and the operation of detecting the signal of the detection part will be described.

As shown in FIGS. 6A and 6B, the detection part 70 is connected to the image switching part 59 provided in the projector 50. The image switching part 59 includes a control circuit part 54 or a control circuit part 55 which performs general control for the whole of the projector 50, and an image processing circuit part 57 which performs processing of switching the direction of the image.

In FIG. 6A, in order to perform interrupt processing for switching the direction of the image at the control circuit part 54, each detection part 70a to 70d is directly connected to each interrupt-detectable port P0 to P3. Under this constitution, since each detection part 70a to 70d is connected to each interrupt-detectable port P0 to P3, when the signal of the magnetic sensor switch 71 in any detection part 70 changes from "OFF" to "ON", the control circuit part 54 can perform directly the interrupt procession corresponding to the port connected to the detection part 70 in which the signal has changed. Further, the control circuit part 54 causes the image processing circuit part 57 to perform the interrupt procession corresponding to the port thereby to cause the part 57 to switch the direction of the image.

On the contrary, FIG. 6B shows another circuit constitution between the control circuit part 55 and the detection part 70. Generally, since the control circuit part does not have so many interrupt-detectable ports, an integrated circuit 56 which integrates the signals of the four detection parts 70a to 70d is interposed between each detection part 70 and the control circuit part 55.

According to such a constitution, for the interrupt-detectable port, only one port P0 is sufficient. The integrated circuit 56 outputs an interrupt signal when the signal of the magnetic sensor switch 71 in any detection part 70 changes from "OFF" to "ON". The control circuit part 55 receives its signal at the port P0, and reads successively each port P1 to P4 to which each detection part 70a to 70d is connected in order to detect which magnetic sensor switch 71 of the four magnetic sensor switches 71 has the signal that has changed from "OFF" to "ON". Thereafter, the control circuit part 55 detects the port in which the signal has changed to "ON", of the ports P1 to P4, thereby to perform the interrupt processing according to its port. The control circuit part 55 causes the image processing circuit part 57 to perform the interrupt processing corresponding to the port, thereby to cause the part 57 to switch the direction of the image. The ports P1, P2, P3 and P4 shown in FIG. 6B are the usual ports which are incapable of interrupt detection.

Figure 7:
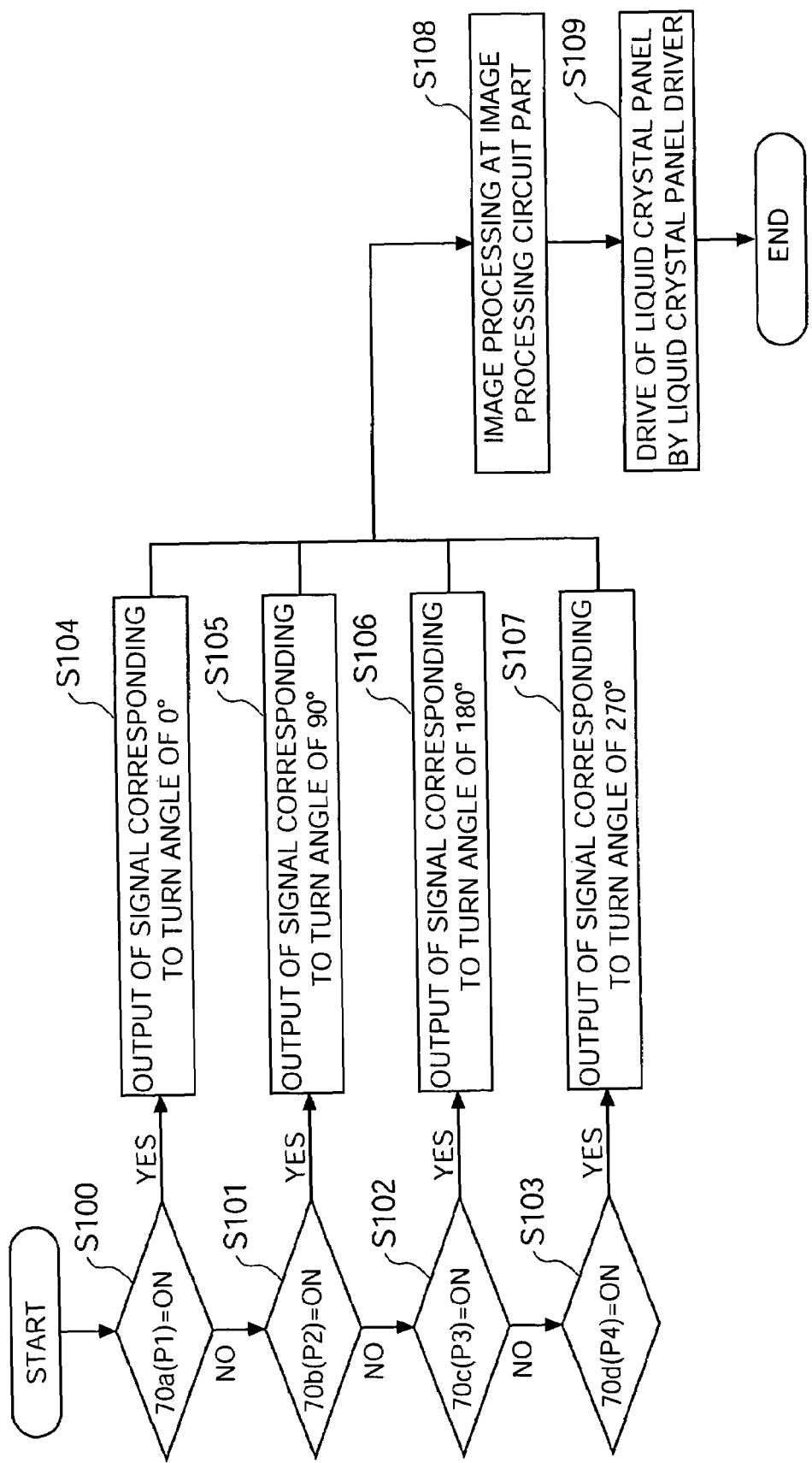
FIG. 7 is a flowchart in the case of using the circuit block diagram shown in FIG. 6B.

FIG. 7 is a flowchart in the case that the circuit constitution shown in FIG. 6B is used. With reference to FIG. 7, a processing method from detection of the turn position of the top plate upside 10a by the detection part 70 till switching of the direction of the projection image of the projector 50 will be described.

The flowchart shown in FIG. 7 is a flowchart after the control circuit part 55, in the case that the signal of the magnetic sensor switch 71 in any detection part 70 changes from "OFF" to "ON" and the integrated circuit 56 described in FIG. 6B outputs an interrupt signal to the control circuit part 55, has received its interrupt signal.

The control circuit part 55 receives the interrupt signal from the integrated circuit 56, and in order to detect which magnetic sensor switch 71 of the four magnetic sensor switches 71 has the signal that has changed from "OFF" to "ON", reads firstly the port P1 to which the detection part 70a is connected in a step S100. In result, in the case that the control circuit part 55 judges that the signal of the port P1 is not "ON", the operation proceeds to the next step S101, and the control circuit part 55 reads the port P2 to which the detection part 70b is connected. In result, in the case that the control circuit part 55 judges that the signal of the port P2 is not "ON", the operation proceeds to the next step S102, and the control circuit part 55 reads the port P3 to which the detection part 70c is connected. In result, in the case that the control circuit part 55 judges that the signal of the port P3 is not "ON", the operation proceeds to the next step S103, and the control circuit part 55 reads the port P4 to which the detection part 70d is connected.

In the step S100, in the case that the control circuit part 55 judges that the signal of the port P1 is "ON", the operation proceeds to a step S104. In the step S104, the control circuit part 55 outputs to the image processing circuit part 57 a signal for causing the part 57 to perform image processing corresponding to the predetermined turn angle of the top plate upside 10a in the position of the detection part 70a, that is 0° (basic position of the turn angle). Further, in the case that the control circuit part 55 judges that the signal of the port P2 is "ON" in the step S101, the operation proceeds to a step S105. In the step S105, the control circuit part 55 outputs to the image processing circuit part 57 a signal for causing the part 57 to perform image processing corresponding to the predetermined turn angle of the top plate upside 10a in the position of the detection part 70b, that is, 90°. In the case that the control circuit part 55 judges that the signal of the port P3 is "ON" in the step 102, the operation proceeds to a step S106. In the step S106, the control circuit part 55 outputs to the image processing circuit part 57 a signal for causing the part 57 to perform image processing corresponding to the predetermined turn angle of the top plate upside 10a in the position of the detection part 70c, that is, 180°. In the case that the control circuit part 55 judges that the signal of the port P4 is "ON" in the step 103, the operation proceeds to a step S107. In the step S107, the control circuit part 55 outputs to the image processing circuit part 57 a signal for causing the part 57 to perform image processing corresponding to the predetermined turn angle of the top plate upside 10a in the position of the detection part 70d, that is, 270°.

Next, the image processing circuit part 57, in a step S108, receives any one of the signals in the steps S104 to S107, and performs the image processing corresponding to its signal. Specifically, in the case that the image processing circuit part 57 receives in the step S105 the signal for performing the image processing corresponding to the angle of 90° that is the turn angle of the top plate upside 10a in the position of the detection part 70b, the part 57 performs the processing of turning the present direction of the image to the angle of 90° with the basic position of the turn angle to display the image. Next, the operation proceeds to a step S109. On the basis of the signal by which the direction of the image has been turned to the angle of 90°, the image processing circuit part 57 drives a liquid crystal panel driver (not shown), whereby a liquid crystal panel (not shown) is driven.

Hereby, the image displayed on the liquid crystal panel is projected from the projection lens 51 to the screen region 13 provided for the top plate upside 10a. Therefore, in the case that the top plate upside 10a is turned to the angle of 90° with the basic position, the user can visually recognize correspondingly to its turn position the projected image as an image turned to the angle of 90°. By the flowchart, correspondingly to the positions at intervals of 90° detected by the detection part 70, the direction of the image to be projected can be switched at the intervals of 90°.

Therefore, in the case that the user turns the top plate upside 10a so that the position of the keyboard 21 (each position at the intervals of 90°) is set on the user side, the top plate upside 10a is fixed by the fixing part 80, and its fixed position is detected by the detection part 70. By the circuit constitution of the projector 50 and the flowchart, in the case that the user has visually recognized from the user side (each position at the intervals of 90°) the image projected on the screen region 13, the direction of the image can be switched so that he can visually recognize the image facing normally. Therefore, the user, from the user side (each position at the intervals of 90°), can visually recognize the projection image facing normally, and can perform the input operation with the keyboard 21.

According to the first embodiment, the following advantages are obtained.

(1) According to the image projection table 100 in the embodiment, the keyboard 21 and the mouse 22 by which the input operation of the projector 50 or the personal computer is performed are provided for the top plate upside 10a, and also the top plate driving part 60 and the fixing part 80 are provided. Hereby, the user, in the case that he operates the projector 50 or the personal computer, turns the top plate upside 10a by the top plate driving part 60 without moving to the position of the keyboard 21, so that the keyboard 21 and the mouse 22 can be located on the user side. Further, since the top plate upside 10a is fixed by the fixing part 80, adjustment of the turn amount is readily performed and the top plate upside 10a can be surely fixed in the appropriate position, so that operativeness of the image projection table 100 can be improved. Further, since the keyboard 21 is also fixed onto the top plate upside 10a, the user can perform the input operation without obstructing the visual recognition of the projection image. Therefore, the convenience of the image projection table 100 improves.

(2) Further, according to the image projection table 100 in the embodiment, the detection parts 70 are provided for the top plate downside 10b in the positions at intervals of 90°. Further, the image switching part 59 (control circuit parts 54, 55 and image processing circuit part 57) provided in the projector 50, correspondingly to the turn of the top plate upside 10a at the intervals of 90°, the direction of the projection image can be switched at the intervals of 90°. Therefore, in the case that the user turns the top plate upside 10a so that the keyboard 21 is located in the user's position (each position at the intervals of 90°), the direction of the image to be projected is also switched correspondingly to its turn, whereby the user can visually recognize the projection image facing normally, Therefore, the efficiency of the input operation with the keyboard 21 can be improved greatly, so that the convenience of the image projection table 100 improves more.

Second Embodiment

Next, a second embodiment of the invention will be described with reference to drawings.

Figure 8:
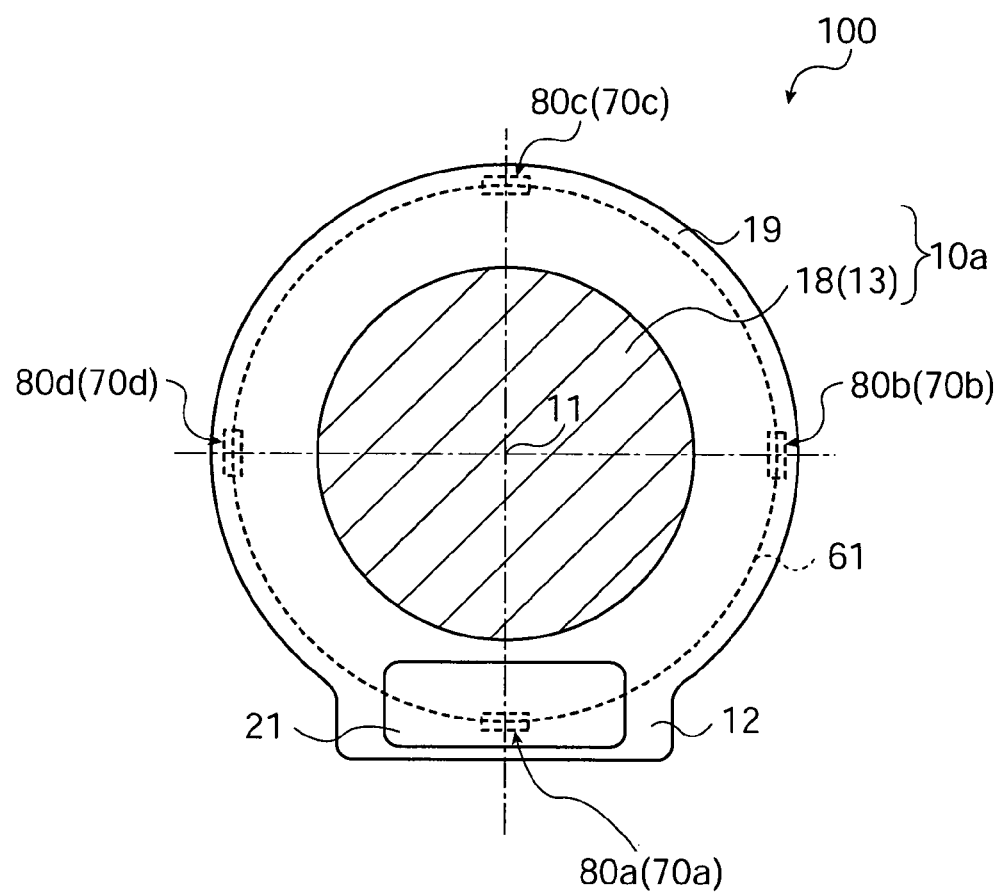
FIG. 8 is a plan view of an image projection table according to a second embodiment.

FIG. 8 is a plan view of an image projection table according to a second embodiment. With reference to FIG. 8, the constitution of the image projection table 100 will be described.

This embodiment is different from the first embodiment in constitution of a top plate 10. In the embodiment, the top plate upside 10a constituting the top plate 10 is composed of one body. However, in this embodiment, as shown in FIG. 8, a top plate upside 10a is divided, and composed of two bodies; a fixed top plate part 18 as a first top plate, and a turnable top plate part 19 as a second top plate. Parts different from the parts in the first embodiment will be described below.

In the turnable top plate part 19, similarly to the top plate in the first embodiment, an operation part 20, a top plate driving part 60, a detection part 70, and a fixing part 80 are formed. In the fixed top plate part 18, a screen region 13 onto which an image is projected is formed. In the top plate upside 10a of the first embodiment, when the top plate upside 10a turns, the keyboard 21 and the screen region 13 also turn. However, in this embodiment, even if the turnable top plate part 19 onto which a keyboard 21 is fixed turns, the fixed top plate part 18 forming the screen region 13 does not turn.

In the fixed top plate part 18, similarly to, the case in the first embodiment, a transmission type screen 15 is formed, using a transparent tempered glass, on the lower surface thereof. The turnable top plate part 19 is formed of colored hard plastic base material. Other constitution and operation are similar to those in the first embodiment.

According to the second embodiment, the advantages (1) and (2) in the first embodiment are similarly obtained, and further the following advantages are obtained.

(1) Since the top plate upside 10a is composed of the two bodies; the fixed top plate part 18 and the turnable top plate part 19, the user, in the case that he operates the projector 50 or the personal computer, turns the turnable top plate part 19 without turning the fixed top plate part 18 forming the screen region 13, whereby the operational part 20 is located on the user side. Therefore, since the fixed top plate part 18 forming the screen region 13 onto which an image is projected does not turn, compared with visual recognition of the projected image in the case that the screen region 13 turns, visual recognition is kept more easily.

(2) Since the top plate upside 10a is composed of the two bodies; the fixed top plate part 18 and the turnable top plate part 19, user's food or drink can be placed on other regions than the projection region 14 to which the image is projected, of the fixed top plate part 18 that does not turn, so that the convenience of the image projection table 100 improves greatly.

(3) Since the top plate upside 10a is composed of the two bodies; the fixed top plate part 18 and the turnable top plate part 19, the materials of the members constituting their bodies can be changed as described above. Hereby, the material of the top plate 10 can be selected according to other functions provided for the top plate 10, so that the image projection table 100 can be improved also in functional and design viewpoints.

Third Embodiment

Next, a third embodiment of the invention will be described with reference to drawings.

Figure 9A:
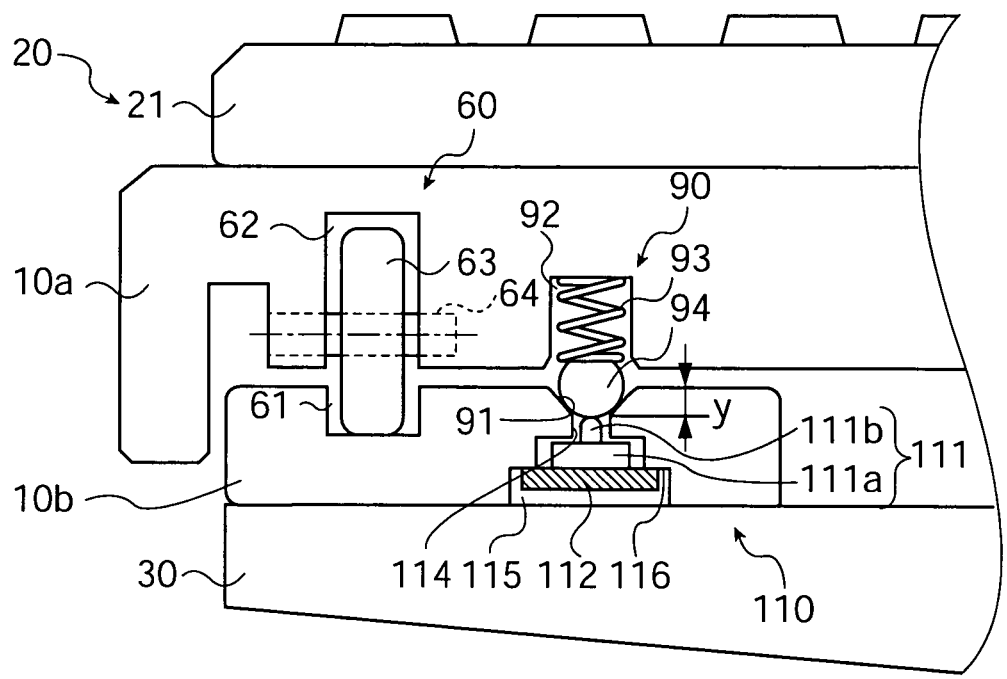
FIG. 9A is a schematically sectional view showing a top plate driving part, a fixing part, and a detection part.
Figure 9B:
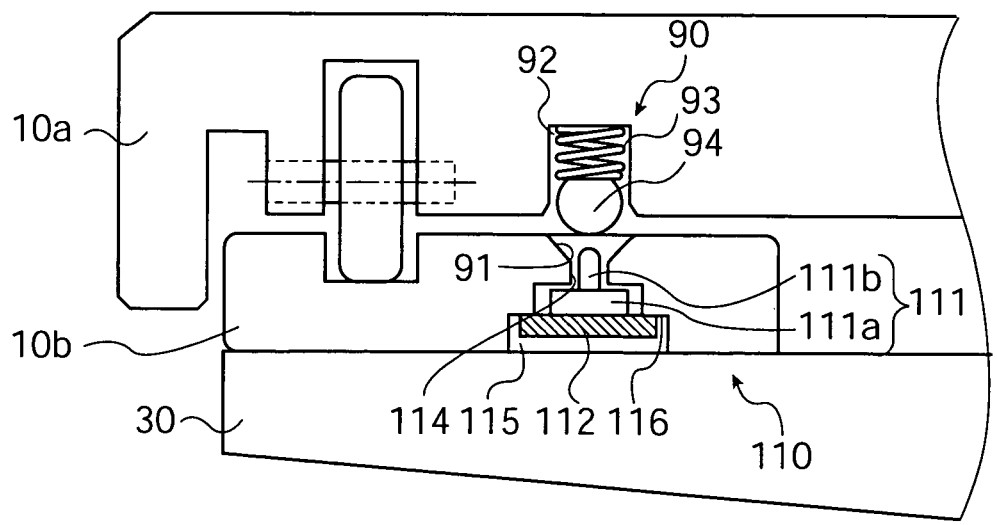
FIG. 9B is a schematically sectional view of a top plate during turning.
Figure 10:
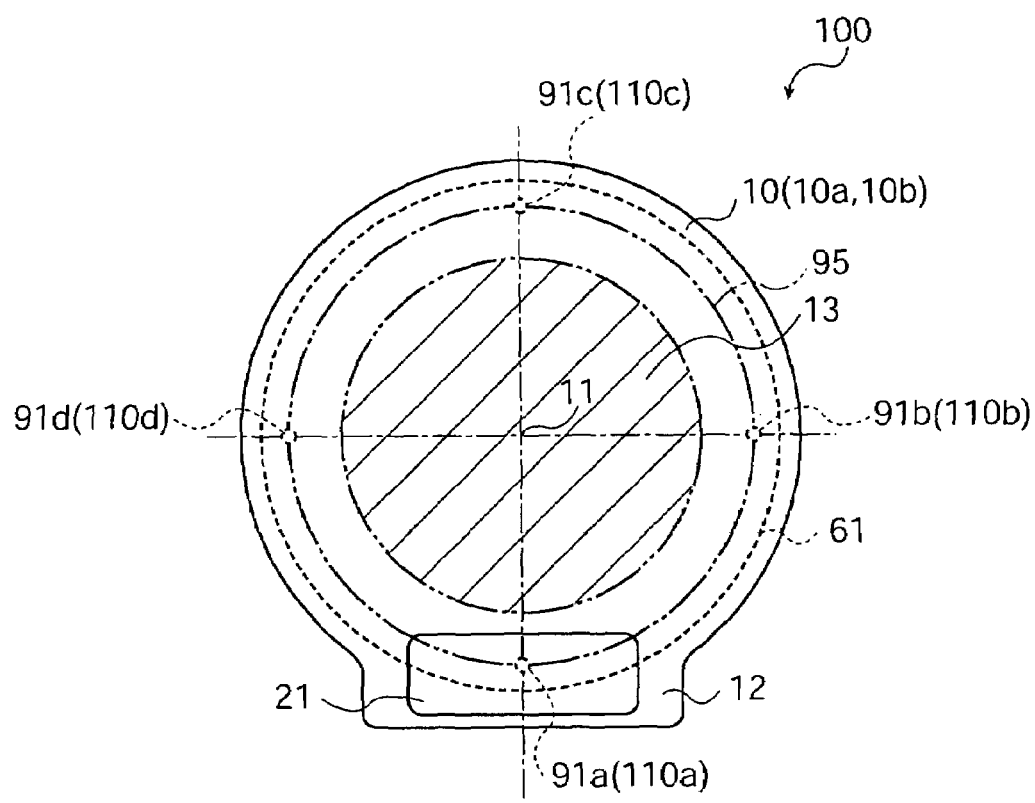
FIG. 10 is a plan view of the image projection table.

FIG. 9 is a schematically sectional view of a top plate of an image projection table according to a third embodiment. FIG. 9A is a schematically sectional view of a top plate driving part, a fixing part, and a detection part. FIG. 9B is a schematically sectional view showing the top plate during turning. FIG. 10 is a plan view of the image projection table. With reference to FIGS. 9 and 10, constitution and operation of an image projection table 100 will be described.

This embodiment is different from the first embodiment only in the constitution of a fixing part and a detection part, and other constitution is similar to that in the first embodiment. Parts different from the parts in the first embodiment will be described below.

In this embodiment, as shown in FIG. 9, a fixing part 90 comprises a cylindrical holding groove 92 formed in a surface of a top plate upside 10a, opposed to a top plate downside 10b; a coil spring 93; and a fixing ball 94. Further, the holding groove 92, the coil spring 93 and the fixing ball 94 which constitute the fixing part 90 are formed at one portion on the lower surface of the top plate upside 10a under the keyboard 21. Further, the coil spring 93 and the fixing ball 94 may be constituted, using the different members, as a unit of one body.

As shown in FIG. 9B, during the turn of the top plate upside 10*a*, the fixing ball 94 comes into contact with the upper surface of the top plate downside 10*b* and is pressed, whereby the coil spring 93 is also compressed and guided into the holding groove 92. This fixing ball 94, when the top plate upside 10*a* turns, also turns by friction power with the upper surface of the top plate downside 10*b* with which the fixing ball comes into contact. As shown in FIG. 10, when the top plate upside 10*a* turns around a center position 11, the fixing ball 94 also turns around the center position 11 on a concentric track 95 (shown by chain double-dashed lines in FIG. 10).

As shown in FIG. 9*a*, on the upper surface of the top plate downside 10*b*, a fixing groove 91 having a semi-spherical recess part is formed in a position on the track 95. The fixing grooves 91 of the fixing part 90 are formed, on the track 95, in four positions (91*a*, 91*b*, 91*c*, and 91*d*) at intervals of 90°. The fixing ball 94 falls into this fixing groove 91 by the turn of the top plate upside 10*a*, whereby the top plate upside 10*a* is fixed.

In order to turn the top plate upside 10*a* after the fixing ball 94 has fallen into the fixing groove 81, it is necessary to apply to the top plate upside 10*a* the power by which the fixing ball 94 gets over the depth y of this fixing groove 91. By utilizing this, the top plate upside 10 is fixed. The user, in the case that the fixed position is not the desired position, applies to the top plate upside 10*a* the power by which the fixing ball 94 gets over the depth y of this fixing groove 91. Hereby, the top plate upside 10*a* can turn, can be turned to the desired position, and can be fixed near that position thereby to be positioned.

Next, regarding a detection part 110 for detecting the turn position (angle) of the top plate 10, its constitution and operation will be described.

The detection part 110 comprises a push-type microswitch 111 and a circuit board 112 on which the microswitch 111 and a cable which transmits the signal detected by the microswitch 111 to the projector 50 are mounted.

Further, a circuit fixing groove 115 for fixing the detection part 110 is formed on the lower surface of the top plate downside 10*b*. The circuit fixing groove 115 has an insertion hole 114 for inserting a movable shaft 111*b* of the microswitch 111 into the lowest portion of the semi-spherical recess part of the fixing groove 91. Here, a shoulder of the circuit board 112 is brought into contact with a step part 116 formed at the circuit fixing groove 115, whereby the detection part 110 is fixed. Further, the detection part 110 is constituted according to the fixing groove 91 constituting the fixing part 90 and formed in the top plate downside 10*b*. Therefore, as shown in FIG. 10, the detection parts 110 are formed in four positions (110*a*, 110*b*, 110*c*, and 110*d*) at intervals of 90°.

By fixing the circuit board 112 as described above, the movable shaft 111*b* of the microswitch 111 is fixed into the fixing groove 91 with the predetermined protruding amount. When the fixing ball 94 falls onto this protruding movable shaft 111*b*, the fixing ball 94 presses and pushes the movable shaft 111*b* to a main body 111*a* side of the microswitch 111 by the protruding amount. Since the protruding amount of the movable shaft 111*b* is set according to a stroke at which the microswitch 111 operates, as soon as the fixing ball 94 falls, the microswitch 111 is switched on thereby to perform the detection.

By this structure, the top plate upside 10*a*, every time it turns at an angle of 90°, is fixed by the fixing part 90, and simultaneously the turn position is detected by the detection part 110. A signal detected by the detection part 110 is transmitted to the projector 50. Since this and later signal flow, circuit constitution, and processing method are similar to the contents described in the first embodiment, their description are omitted.

According to the third embodiment, the advantages (1) and (2) in the first embodiment are similarly obtained, and further the following advantage is obtained.

(1) In the first embodiment, the fixing part 80 is formed on the track of the rail groove 61 formed in the top plate downside 10*b*. However, in this embodiment, the fixing part 90 is formed not on the track of the rail groove 61 but on another track 95. In the first embodiment, when the top plate upside 10*a* is turned, the top plate upside 10*a* rises by the depth χ of the fixing groove 81. However, in this embodiment, such rising does not exist but the top plate upside 10*a* can turn stably, so that the convenience of the image projection table 100 improves more.

Fourth Embodiment

Next, a fourth embodiment of the invention will be described with reference to drawings.

Figure 11:
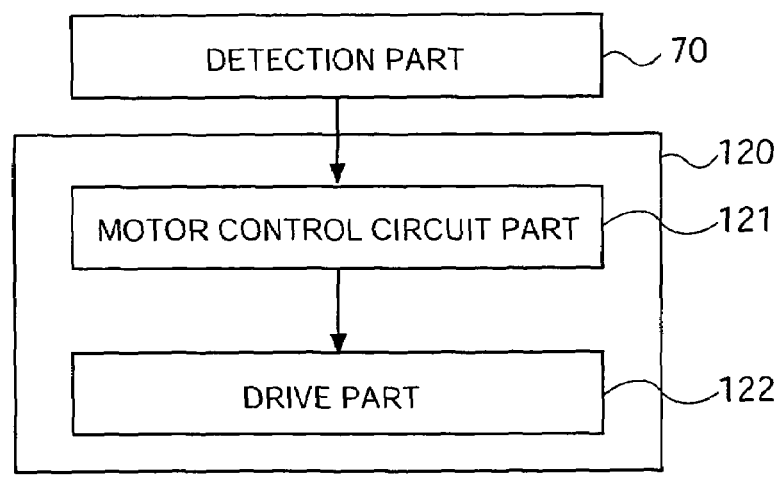
FIG. 11 is a circuit block diagram of a detection part and a projector moving part in an image projection table according to a fourth embodiment.
Figure 12:
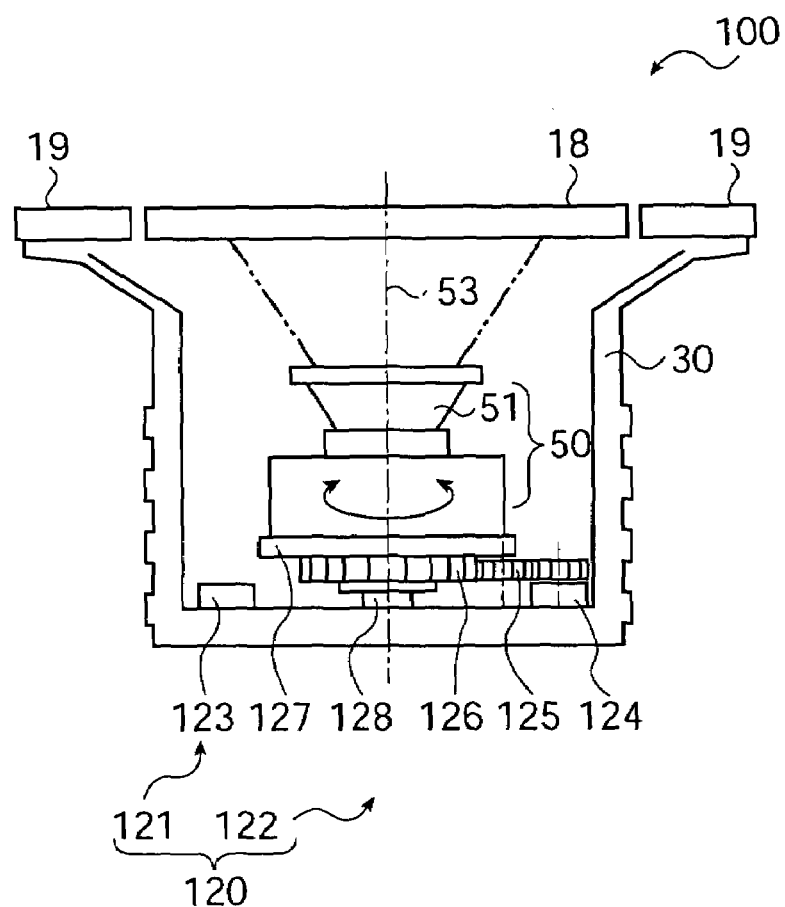
FIG. 12 is a schematically sectional view of the image projection table.

FIG. 11 is a circuit block diagram of a detection part and a projector moving part in an image projection table according to a fourth embodiment. FIG. 12 is a schematically sectional view of the image projection table. With reference to FIGS. 11 and 12, the constitution of an image projection table 100 will be described.

This embodiment relates to a method of switching an image of a projector 50 to be projected onto a screen region 13. The image processing in the projector 50, which has been described in the first to third embodiments, is not performed, but the projector 50 is turned mechanically thereby to execute switching.

As shown in FIG. 11, in the embodiment, a motor control circuit part 121 constituting a projector moving part 120 receives a signal of a detection part 70. Next, the motor control circuit part 121, on the basis of the received signal from the detection part 70, drives a drive part 122 constituting the projector moving part 120, thereby to turn the projector 50 body.

Further, as shown in FIG. 12, the projector moving part 120 is placed in a housing 30. The motor control circuit part 121 is composed of a motor control circuit 123. The drive part 122 comprises a forward-reverse rotatable motor 124, a gear train 125 which decelerates the turn of the motor 124 to transmit the drive power, a turn gear 126 that is in the last stage of the gear train 125, a projector fixing base 127 which is formed onto the turn gear 126 and mounts the projector 50 thereon to fix the projector 50, and a projector turn shaft 128 that is a shaft by which the projector 50 is turned.

The projector turn shaft 128 is arranged so that its axis coincides with an optical axis 53 of a projection lens 51 constituting the projector 50, and the turn gear 126 is arranged so as to turn around this projector turn shaft 128. Further, a top plate 10, similarly to the constitution of the top plate in the second embodiment, is divided into a turnable top plate part 19 and a fixed top plate part 18.

The concrete operation of the image projection table 100 in this embodiment will be described.

When the turn of the turnable top plate part 19 by the user is detected by the detection part 70 similar to that in the first and second embodiments, the detection signal is transmitted to the motor control circuit 123. The motor control circuit 123 receives the transmitted signal, and specifies the predetermined angle of turn on the basis of the received signal. Next, the motor control circuit 123 causes the motor 124 to drive. The drive of the motor 124 is transmitted to the gear train 125, decelerated to the predetermined turn speed by the gear train 125, and transmitted to the turn gear 126 provided at the last stage, whereby the turn gear 126 turns at the predetermined turn speed around the projector turn shaft 128. By the turn of the turn gear 126, the projector fixing base 127 fixed to the turn gear 126 turns, so that the projector 50 turns. Further, when the projector 50 turns to the predetermined angle by the motor control circuit 123, the drive of the motor 124 is stopped, and the turn of the projector 50 ends. The predetermined turn angle means, similarly to that in the first and second embodiments, a turn angle of the top plate 10 which is at intervals of 90° where the detection parts 70 are formed.

By the above circuit constitution and operation, with the turn of the turnable top plate part 19 by the user, the projector 50 body turns, so that an image of the projector 50 to be projected onto the screen region 13 can be turned. Further, the embodiment can be similarly applied to the image projection table 100 which uses the fixing part 90 and the detection part 110 in the third embodiment.

According to the fourth embodiment, the advantages except the advantage by the image switching part 59 in the first to third embodiments are similarly obtained, and further the following advantages are obtained.

(1) Since the projector moving part 120 for turning the projector 50 body is provided in the housing 30, with the turn of the turnable top plate part 19 by the user, the projector 50 body can be mechanically turned, so that an image of the projector 50 to be projected onto the screen region 13 can be turned. Hereby, when the user turns the turnable top plate part 19 so that the keyboard 21 is located in his position (each position at intervals of 90°), an image to be projected is also switched with its turn. Therefore, the user can visually recognize the normally faced projection image. Therefore, the efficiency of the input operation by the keyboard 21 can be improved greatly, so that the convenience of the image projection table 100 improves more.

(2) According to the embodiment, it is not necessary to provide in the projector 50 the image switching part 59 which has been described in the first to third embodiments to perform the image processing for switching the direction of the image. Therefore, degree of freedom in the selection of the projector 50 used in the image projection table 100 increases.

Fifth Embodiment

Next, a fifth embodiment of the invention will be described with reference to drawings.

Figure 13:
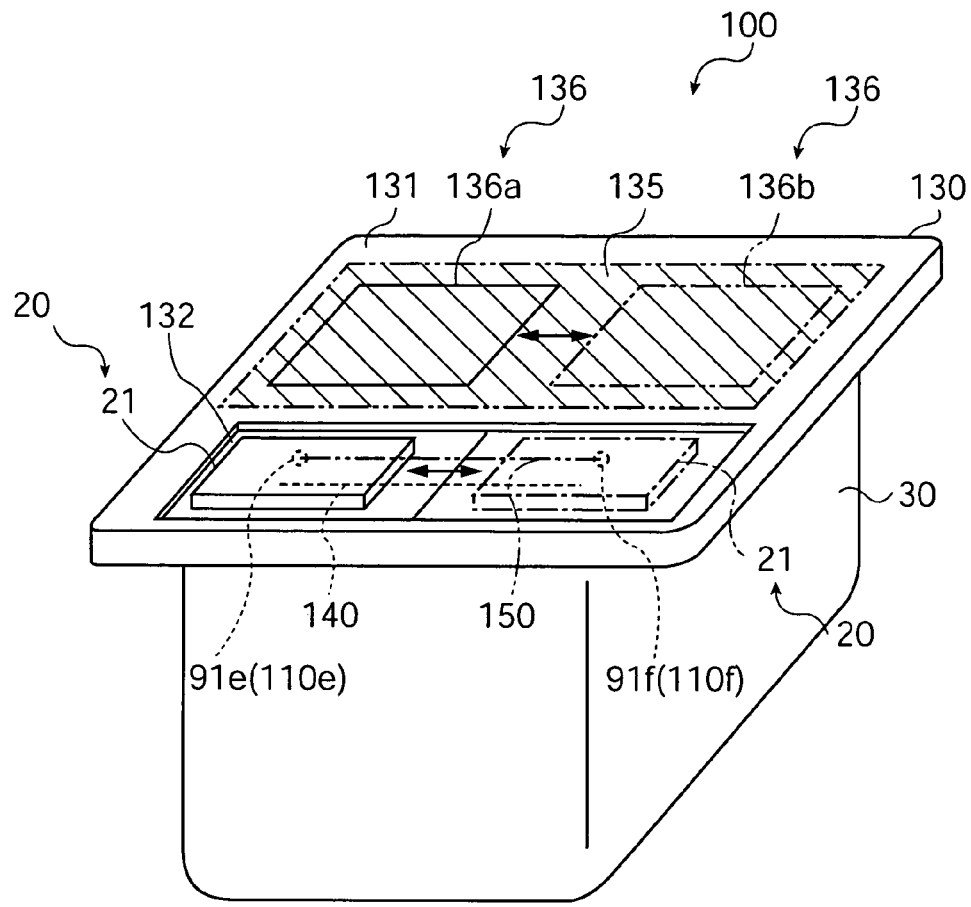
FIG. 13 is a schematically perspective view of an image projection table according to a fifth embodiment.
Figure 14:
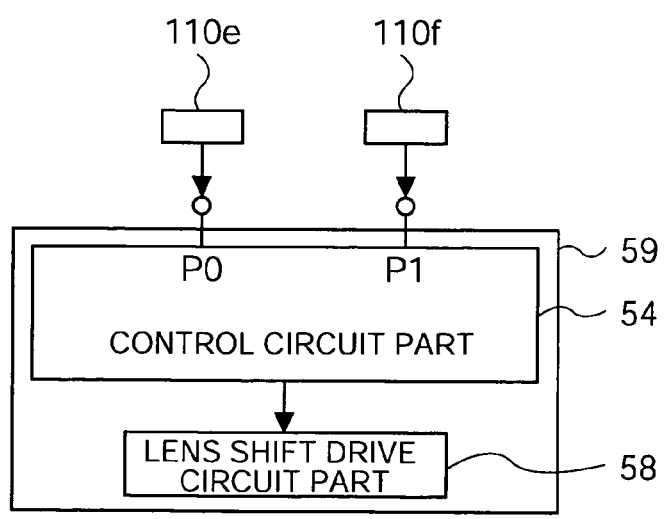
FIG. 14 is a circuit block diagram of a detection part and an image switching part.

FIG. 13 is a schematically perspective view of an image projection table according to a fifth embodiment. FIG. 14 is a circuit block diagram of a detection part and an image switching part. With reference to FIGS. 13 and 14, the constitution and operation of an image projection table 100 will be described. Further, in the embodiment, the top plate is not turned but moved in the left and right directions.

As shown in FIG. 13, an image projection table 100 comprises a top plate 130 having a key board 21 as an operational part 20 and a screen region 135 on which an image projected from a projector 50 is projected, and a housing 30 in which the projector 50 having a lens shift function capable of shifting projection of an image to the left and right is arranged nearly in the center.

The top plate 130 is divided into a fixed top plate 131 fixed to the housing 30, and a movable top plate part 132 which can move in the left and right directions. In the fixed top plate part 131, similarly to the cases in the first to fourth embodiments, a transmission type screen (not shown) is formed on a transparent tempered glass thereby to constitute a screen region 135. Further, the movable top plate part 132 comprises a movable top plate upside and a movable top plate downside (which are not shown), and the movable top plate downside is fixed to the housing 30. Further, similarly to the case in the third embodiment, on the upper surface of the movable top plate upside, the keyboard 21 as the operational part 20 is fixed; and on the lower surface of the movable top plate upside and on the upper surface of the movable top plate downside, a top plate driving part 60, a fixing part 90 and a detection part 110 are formed.

The top plate driving part 60 in the embodiment has, on the movable top plate upside, a wheel groove 62, a wheel 63, and a support axis pin 64, and has, on the movable top plate downside, a rail groove 140 that becomes a track on which the wheel 63 moves, which is linearly formed in the left and right directions (rail groove 140 shown by broken lines in FIG. 13). The user applies the power in the direction where he desires to move the movable top plate part 132, whereby the movable top plate part 132 moves along the rail groove 140.

The fixing part 90 in the embodiment has, on the movable top plate upside, a holding groove 92, a coil spring 93 and a fixing ball 94, and has, on the movable top plate downside, similarly to the case in the third embodiment, a fixing groove 91 forming a semi-spherical recess part. The fixing grooves 91 are spaced at two locations (91e, 91f) in the left and right directions where the movable top plate part 132 moves. The fixing ball 94 provided for the fixing part 90 turns on a track 150 (shown by chain double-dashed lines in FIG. 12) with the left and right movement of the movable top plate part 132.

A detection part 110 in the embodiment is provided correspondingly to the fixing groove 91 constituting the fixing part 90 with the similar constitution to the constitution in the third embodiment. In the embodiment, correspondingly to the two fixing grooves 91e and 91f, two detection parts 110e and 110f are formed.

With reference to FIG. 14, the circuit constitution of the detection part 110 and an image switching part 59 will be described. In the circuit constitution of the detection part 110 and the image switching part 59 in the embodiment, the two detection parts 110e and 110f are respectively connected to a control circuit part 54 having interrupt-detectable ports P0 and P1. Further, the control circuit part 54 is connected to a lens shift drive circuit part 58.

Under this constitution, when a signal of a microswitch 111 in either of the detection parts 110e and 110f changes from "OFF" to "ON", either of the corresponding ports P0 and P1 of the control circuit part 54 outputs an interrupt signal. The control circuit part 54 outputs a signal for moving the projection lens 51 correspondingly to the interrupt signal to the lens shift drive circuit part 58. The lens shift drive circuit part 58, upon reception of its signal, moves the projection lens 51 provided for the projector 50.

Here, the concrete operation of the image projection table 100 will be described in brief.

In the case that the user has moved to the right the movable top plate part 132 that is located on the left since he desires to use the keyboard 21 on the right side, the movable top plate part 132 is fixed by the fixing groove 91f, and the signals of the detection part 110f changes to "ON" and is transmitted to the port P0 of the control circuit part 54. The control circuit part 54 outputs the signal indicating the contents of the interrupt processing which is allocated to the port P0 to the lens shift drive circuit part 58. The lens shift drive circuit part 58, upon reception of that signal, executes the predetermined amount of movement of the projection lens 51 to the right, which indicates the contents of the interrupt processing. Hereby, a projection image 136*a* on the left moves to the right and is projected as a projection image 136*b*. Therefore, the user, on the right side of the image projection table 100, can perform the operation of the keyboard 21 while visually recognizing the projection image 136*b* to be projected to the right.

According to the fifth embodiment, the following advantage is obtained.

(1) According to the embodiment, the user, with the movable top plate part 132 moving to the left and right, can operate the keyboard 21. Further, since the projection image 136 of the projector 50 moves to the left and right with the movement of the movable top plate part 132, the user can visually recognize the appropriate image to operate the keyboard 21. Hereby, the top plate 10 can not only be turned like in the cases of the first to fourth embodiments but also be moved to the left and right, so that the convenience of the image projection table 100 improves more.

The invention is not limited to the above-described embodiments but various changes and improvements can be added. Modified examples will be described below.

MODIFIED EXAMPLE 1

In the first to fifth embodiments, the detection part uses the magnetic sensor switch using magnetism or the microswitch using the mechanical power. However, the invention is not limited to this but an encoder using light or various sensors such as a position sensor using a gyroscope can be used. Therefore, according to the necessary detection level (the moving amount to be detected), the sensor can be selected.

MODIFIED EXAMPLE 2

In the first to fifth embodiments, in the fixing part, the fixing groove 91 is formed in the rail groove 61, and it is necessary to apply the power by which the wheel 63 gets over the different-in-level portion between the fixing groove 81 and the rail groove 61. Using this fact, the top plate upside 10*a* is fixed. However, the invention is not limited to this, but methods of electrically controlling fixing by an electromagnetic lock using a solenoid, or a gear and a motor can be also used.

MODIFIED EXAMPLE 3

In the fifth embodiment, the projector 50 is mounted with the lens shift function by which the projection of image can be moved to the left and right. However, the invention is not limited to this. For example, the projector 50 can be moved to the left and right, using a motor and a gear. Particularly, using a motor, a rack, a gear, and a pinion, the projector 50 can be mechanically moved to the left and right or up and down. By adopting such constitution, a projector having no lens shift function can also be adopted.

MODIFIED EXAMPLE 4

In the first and fifth embodiments, the keyboard 21 is used as the operational part 20, and fixed to the top plate. However, the keyboard 21 may not be fixed, but may be placed detachably. Hereby, in the case of failure of the keyboard 21, the keyboard 21 can be exchanged, so that maintenance property improves.

MODIFIED EXAMPLE 5

In the first and fifth embodiments, though the keyboard 21 is used as the operational panel 20, a touch panel may be used. In the case of use of the touch panel, the unevenness on the top plate is eliminated, so that degree of freedom in design of the image projection table 100 increases.

MODIFIED EXAMPLE 6

The projector 50 in the embodiments is the transmission liquid crystal type projector. However, the invention is not limited to this, but the invention can be applied also to projectors which adopt a DLP (Trademark Registration) (Digital Light Processing) type and an LCOS (Liquid Crystal On Silicon) type that is a reflection liquid crystal type.

What is claimed is:

1. An image projection table comprising:
    a projector which projects an image;
    a housing in which the projector is housed; and
    a top plate on which the image projected from the projector is projected, wherein
    the top plate includes an operational part for operating the projector, and a top plate driving part which moves the top plate so that the operational part is located on the operator side.

2. The image projection table according to claim 1, comprising a detection part which detects the movement of the top plate, and an image switching part which switches an image projecting direction, wherein
    in the case that the detection part has detected the movement, the image switching part switches the direction of the image to be projected from the projector on the basis of a detection signal of the detection part correspondingly to the moving amount, thereby to switch the direction of the image to be projected on the top plate.

3. The image projection table according to claim 1 comprising a detection part which detects the movement of the top plate, and a projector moving part which moves the projector, wherein
    in the case that the detection part has detected the movement, the projector moving part, on the basis of a detection signal of the detection part, correspondingly to the moving amount, moves the projector body, thereby to switch the direction of the image to be projected on the top plate.

4. The image projection table according to claim 1 comprising a fixing part which fixes the moving top plate.

5. An image projection table comprising:
    a projector which projects an image;
    a housing in which the projector is housed; and
    a top plate on which the image projected from the projector is projected, wherein
    the top plate includes a first top plate on which the image projected from the projector is projected, and a second top plate having an operational part for operating the projector; and
    the second top plate includes a top plate driving part which moves the second top plate so that the operational part is located on the operator side.

* * * * *